(No Model.)
T. SHAW.
KNIFE HOLDER.
No. 479,669. Patented July 26, 1892.
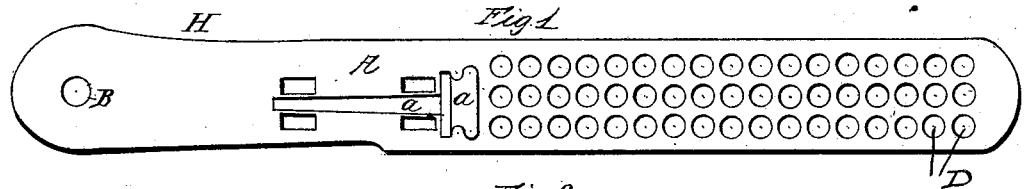
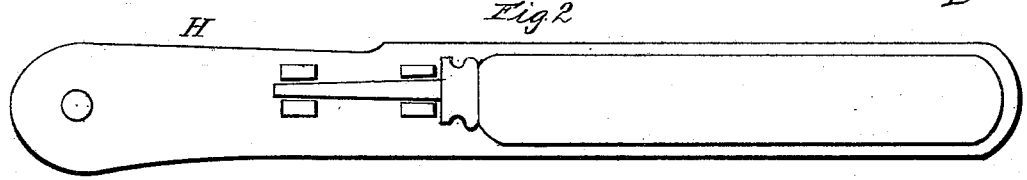
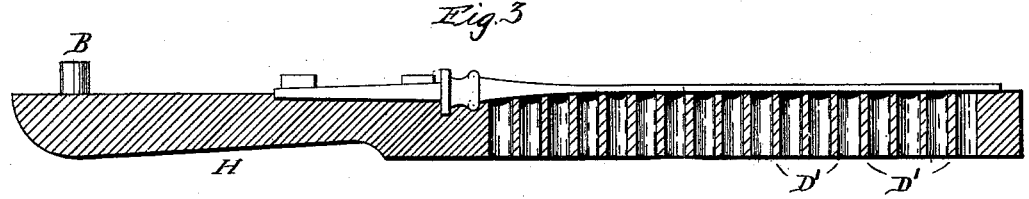
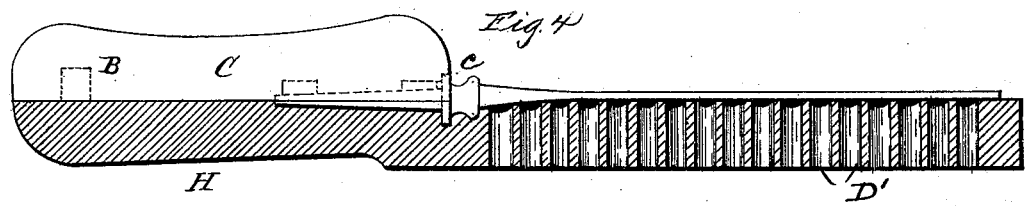
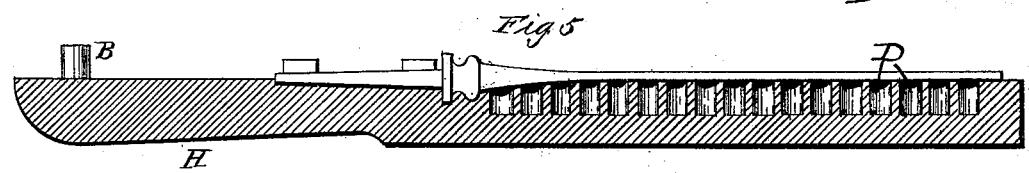
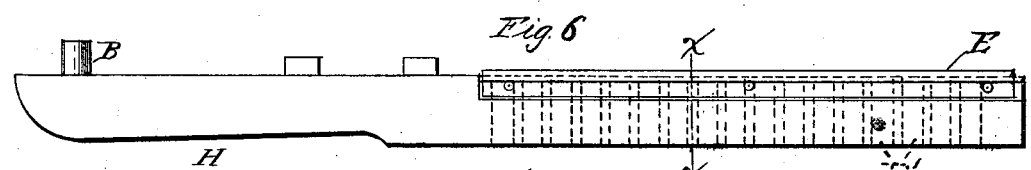
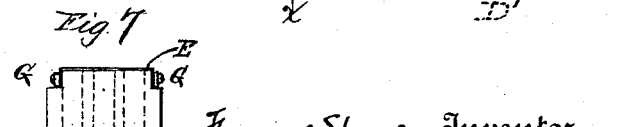
Witnesses
Joseph Sullivan
Luke J Griffin
Thomas Shaw Inventor
By his Attorney G. L. Felding Thompson
THE NORRIS PETERS CO., PHOTO-LITHO., WASHINGTON, D. C.

UNITED STATES PATENT OFFICE.

THOMAS SHAW, OF NEWARK, NEW JERSEY.

KNIFE-HOLDER.

SPECIFICATION forming part of Letters Patent No. 479,669, dated July 26, 1892.

Application filed July 22, 1891. Serial No. 400,362. (No model.)

*To all whom it may concern:*

Be it known that I, THOMAS SHAW, of the city of Newark, county of Essex, and State of New Jersey, have invented a new and useful Improvement in Knife-Holders, of which the following is such a full, clear, and exact description as will enable others skilled in the art to which it most nearly appertains to make and use the same, when taken in connection with the accompanying drawings, in which—

Figure 1 is a face view of the holder. Fig. 2 is a face view of the holder with a knife-blade applied thereto. Fig. 3 is a sectional view of the same. Fig. 4 is a sectional view of the same with the keeper on. Fig. 5 is a sectional view of a modification of the knife-holder with the knife-blade on it. Fig. 6 is another modification wherein the holder is covered with a cloth. Fig. 7 is a cross-section of the modification shown in Fig. 6 on line $x\ x$.

This my invention relates to holders for knife-blades to be used in holding the blade during the grinding and polishing processes; and it consists of a holder for the blade, bolster, and tang, and the keeper fitting over the tang and exposing one side of the blade and the various modifications and combinations hereinafter specified and claimed.

The holder A consists of a piece of metal, preferably brass or bronze, of a size slightly wider than the knife-blade and longer than the blade, bolster, and tang, in the face of which there is cut a die or pocket for the bolster and tang, as $a$, and an even surface is provided for the blade. The pocket or die $a$ for the tang and bolster is in depth about one-half the thickness of the tang and bolster. The handle H of the holder is a prolongation of the holder or part in which the die or pocket for the tang and bolster is situated. On the face of the holder is the dowel-pin B to fit in a hole in the other half of the handle or keeper C, so as to retain it in its proper position. The keeper C consists of a piece of metal, on one side of which is cut a die or pocket $c$ for the tang and bolster and knife, being in depth about equal to one-half the thickness of the tang and bolster and having a hole for the dowel-pin B. The face of the holder where the blade of the knife lies upon it is preferably perforated, as shown in Fig. 5, where the holes D do not go all the way through the holder, but form chambers under the blade, which give a circulation of air and keep the blade cool when it is being ground. The holes in the holder may be made all the way through the holder, as shown at D' in Figs. 3 and 4.

Another modification is shown in Fig. 6, in which the holder is supplied with a cloth covering E over the hole D, so that the cloth may be in contact with the blade when it is on or in the holder. The cloth E may be attached in any suitable manner or simply laid between the knife and the holder; but preferably I fasten the cloth to the sides by strips G G, secured to the sides of the holder over the cloth, as shown in cross-section at Fig. 7. It is manifest that a cloth can be applied to any form of holder shown in the same manner. When a cloth is used on the holder, I may immerse the holder in water, wet the cloth, and fill or partially fill the holes, so that the water shall keep the blade cool during the grinding.

The operation of the holder is as follows: The cloth being wet by immersing the holder in water, the knife is laid on it, the bolster and tang fitting in the die, and the keeper C is put on and fixed tightly against the tang and the bolster of the knife. The hand of the operator holds it in place and firmly keeps the blade of the knife in place on the holder while it is being ground. To grind the other side of the blade, another holder is necessary, in which the seat for the blade has an opposite slant to accommodate the bevel on which the knife-blade is placed and the exposed side ground. The blade is thus provided with a stiff backing all the time it is being ground and is kept cool as well, so that an even surface bevel and taper is given the blade from bolster to point without injuring the temper of the blade.

What I claim as new, and desire to secure by Letters Patent, is—

1. The herein-described knife-holder with a perforated seat adapted to be engaged by the knife-blade.

2. The herein-described knife-holder, provided with a perforated seat for the knife-blade and clamping means for engaging other portions of the knife to hold said blade in engagement with said perforated seat.

3. The herein-described knife-holder, provided with a perforated seat for the knife-blade, a recessed portion for the tang and bolster, and the keeper, substantially as described.

4. The herein-described knife-holder, provided with the perforated portion adapted to support the knife-blade and a porous covering engaging said perforated portion of the holder.

5. The herein-described knife-holder, provided with the perforated portion adapted to support the knife-blade, a porous covering for said perforated part, and the clamping devices for securing said porous covering to said holder.

THOS. SHAW.

Witnesses:
CHAS. E. FOSTER,
JAMES H. SHAW.